(12) United States Patent
Hirano et al.

(10) Patent No.: US 6,445,789 B1
(45) Date of Patent: *Sep. 3, 2002

(54) TELEPHONE HAVING HAND-SET TO BE USED ALSO AS VOICE INPUT/OUTPUT DEVICE FOR PERSONAL COMPUTER

(75) Inventors: Kazushige Hirano; Hiroshi Kamezawa, both of Tokyo (JP)

(73) Assignee: NEC Corporation (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/018,286

(22) Filed: Feb. 4, 1998

(30) Foreign Application Priority Data

Feb. 10, 1997 (JP) .............................................. 9-026340

(51) Int. Cl.[7] ........................... H04M 11/00; H04M 1/00
(52) U.S. Cl. ................ 379/352; 379/93.09; 379/428.02
(58) Field of Search ........................... 379/442, 428.02, 379/93.09, 93.07, 100.01, 352, 93.08, 93.06

(56) References Cited

U.S. PATENT DOCUMENTS

| 4,907,267 | A | * | 3/1990 | Gutzmer ................... 379/93.09 |
| 5,452,289 | A | * | 9/1995 | Sharma et al. ........... 379/93.08 |
| 5,799,067 | A | * | 8/1998 | Kikinis et al. ........... 379/93.06 |
| 6,169,734 | B1 | * | 1/2001 | Wilson ..................... 379/93.09 |

FOREIGN PATENT DOCUMENTS

| JP | 63-97948 | 6/1988 |
| JP | 1-292949 | 11/1989 |

* cited by examiner

Primary Examiner—Jack Chiang
(74) Attorney, Agent, or Firm—Dickstein, Shapiro, Morin & Oshinsky, LLP

(57) ABSTRACT

A telephone includes a telephone circuit, a connector, and a switch. The connector is capable of being connected to a voice input/output interface in a network for a computer. The switch makes a selection as to whether a hand-set having a microphone and a loudspeaker is to be connected to the connector or to the telephone circuit. In this telephone, a hand-set accessory therefor can also be connected, as a voice input/output device for the personal computer, to the voice input/output interface for the computer network.

7 Claims, 5 Drawing Sheets

Fig. 5

| SW1 | HAND-SET | SW1-1 | SW1-2 | SW1-3 | SW1-4 | SW1-5 | SW1-6 | HSW-1 | HSW-2 | STATE |
|---|---|---|---|---|---|---|---|---|---|---|
| TEL SIDE | ON-HOOK STATE | m | m | m | m | m | m | b | b | STATE 1 |
| TEL SIDE | OFF-HOOK STATE | m | m | m | m | m | m | m | m | STATE 2 |
| PC SIDE | ON-HOOK STATE | b | b | b | b | b | b | b | b | STATE 3 |
| PC SIDE | OFF-HOOK STATE | b | b | b | b | b | b | m | m | STATE 4 |

TELEPHONE HAVING HAND-SET TO BE USED ALSO AS VOICE INPUT/OUTPUT DEVICE FOR PERSONAL COMPUTER

BACKGROUND OF THE INVENTION (1) Field of the Invention

The present invention relates to a telephone, and more particularly to an analog telephone having a hand-set to be used also as a voice input/output device for a computer such as a personal computer.

(2) Description of the Related Art

A prior art telephone of the kind to which the present invention relates will now be described to assist the understanding of the present invention. Such a prior art telephone is shown in FIGS. 1 and 2, FIG. 1 showing an outer view, and FIG. 2 showing, in a block diagram, the internal construction of the telephone. The telephone has a body 1 which has a hook switch HSW. The hook switch HSW is turned on and off by placing and removing a hand-set 2 on and from the body 1. The body of the telephone also has a connector (or modular jack) 3 provided on its top for line connection.

The hand-set 2, as shown in FIG. 2, includes a microphone (i.e., electret condenser microphone, dynamic type microphone, piezoelectric type microphone, etc.) 22 as an electro-acoustic transducer device, and a loudspeaker (of dynamic type, piezoelectric type, etc.) 21, and is used as an exclusive device for the body 1 of the telephone.

The hand-set 2 is connected through a hand-set connection connector 4 in the telephone body 1 to a telephone circuit, i.e., dial/speach circuit 11. The dial/speach circuit 11 is connected through a hook switch HSW to the connector 3.

The connector 3 is also connected through a series circuit consisting of a capacitor C and a resistor R to a ringer circuit 12. The ringer circuit 12 drives a ringer loudspeaker 13.

For speech communication with other computer users through such computer networks as internets and intranets, it is necessary to use a computer such as a PC (personal computer) as an exclusive outer microphone and a loudspeaker (including a head set). This means that it is desired to use the hand-set shown in FIGS. 1 and 2 as a voice input/output device for a computer as well.

Japanese Utility Model Application Kokai Publication No. Sho 63-97948 shows a terminal device (such as a facsimile device) with a hand-set device, in which a hook switch should be provided on the hand-set side. This device permits use of a four-pin modular jack for the connection between the hand-set and device body 1 while two lines for transmitter and two lines for receiver remain independent from one another.

This technique, however, does not permit the use of accessory hand-set as a voice input/output device for a computer such as a PC.

Japanese Patent Application Kokai Publication No. Hei 1-292949 discloses a technique, in which an accessory hand-set can be utilized inside a facsimile device having a voice response function to record response messages for recording in absence.

Again the disclosed technique does not permit use of accessory hand-set as a voice input/output device for a computer such as a PC.

SUMMARY OF THE INVENTION

An object of the present invention, therefore, is to overcome the problems existing in the prior art, and to provide a telephone which permits a hand-set accessory therefor to be also used as a voice input/output device for a computer such as a PC.

According to an aspect of the invention, there is provided a telephone having a modular jack for being connected to a telephone line, comprising: a telephone circuit; a connector capable of being connected to a voice input/output interface in a network for a computer; and selecting means for making a selection as to whether a hand-set having a microphone and a loudspeaker is to be connected to the connector or to the telephone circuit.

The selecting means may include a switch for connecting a ringer loudspeaker as well to the connector when the hand-set is selected to be connected to the telephone circuit. The selecting means may also include a switch for disconnecting the telephone circuit from the telephone line when the hand-set is selected to be connected to the connector.

The invention is featured in a function or an arrangement in which the hand-set of the telephone can also be connected, as a voice input/output device for a computer such as a PC, to the voice input/output interface for the computer network.

BRIEF DESCRIPTION OF THE DRAWINGS

The above and other objects, features and advantages of the present invention will be apparent from the following description of a preferred embodiment of the invention explained with reference to the accompanying drawings, in which:

FIG. 5 is a view showing connection states of switches in the embodiment of the invention.

PREFERRED EMBODIMENT OF THE INVENTION

Now, a preferred embodiment of the invention will be explained with reference to the accompanying drawings.

Figure 1:
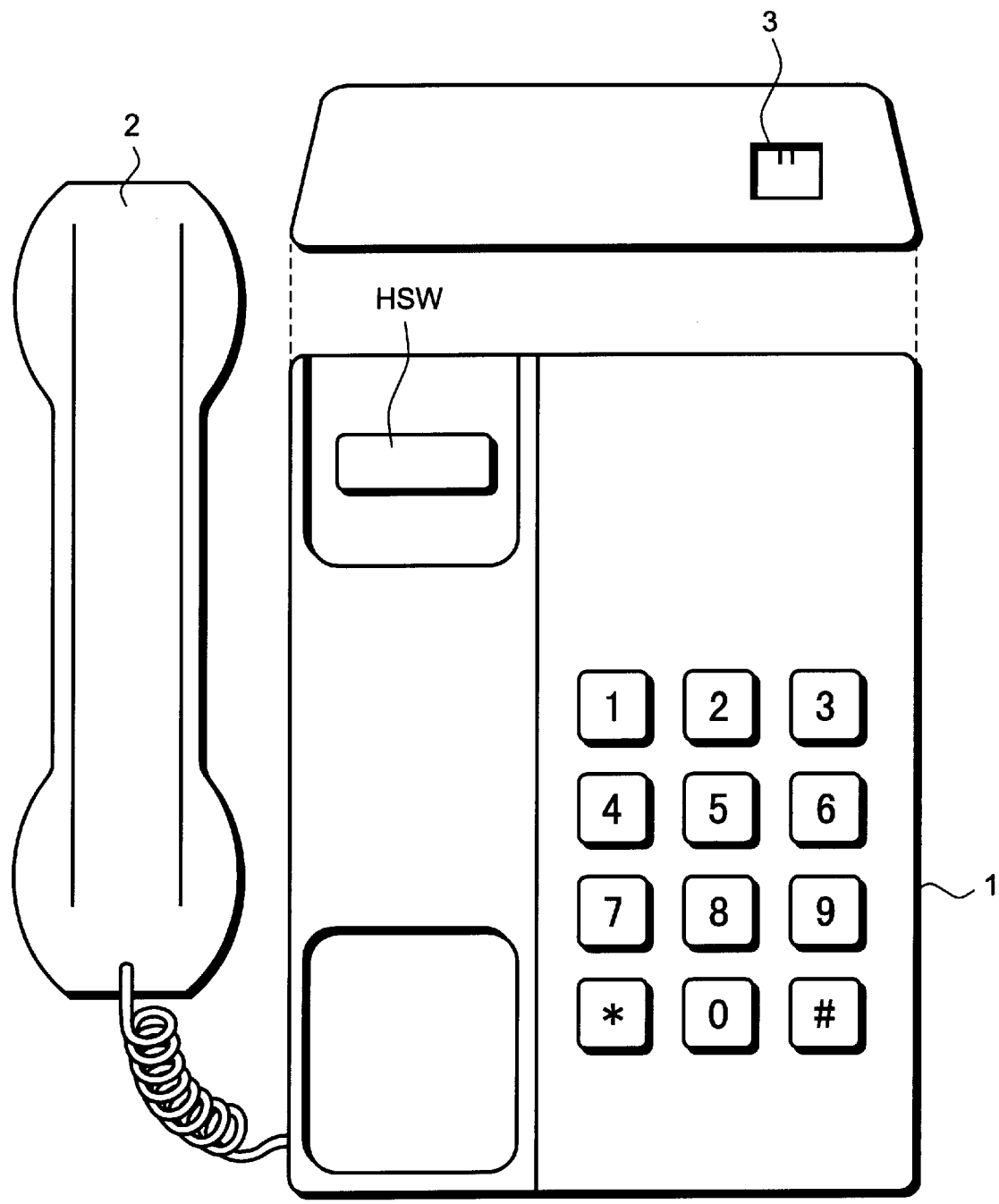
FIG. 1 is an outer view showing a prior art telephone.
Figure 2:
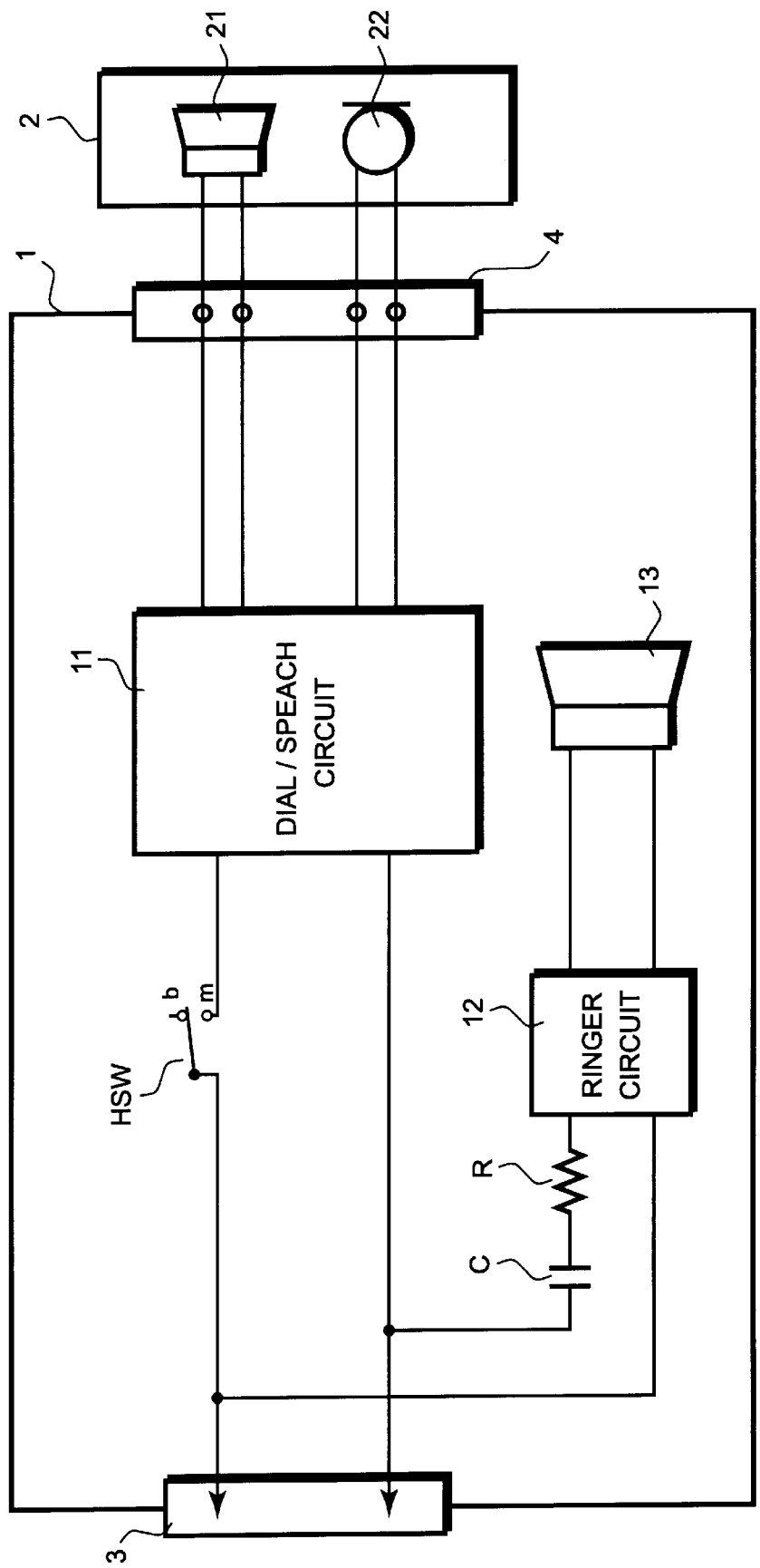
FIG. 2 is a block diagram showing the inner circuit construction of the prior art telephone.
Figure 3:
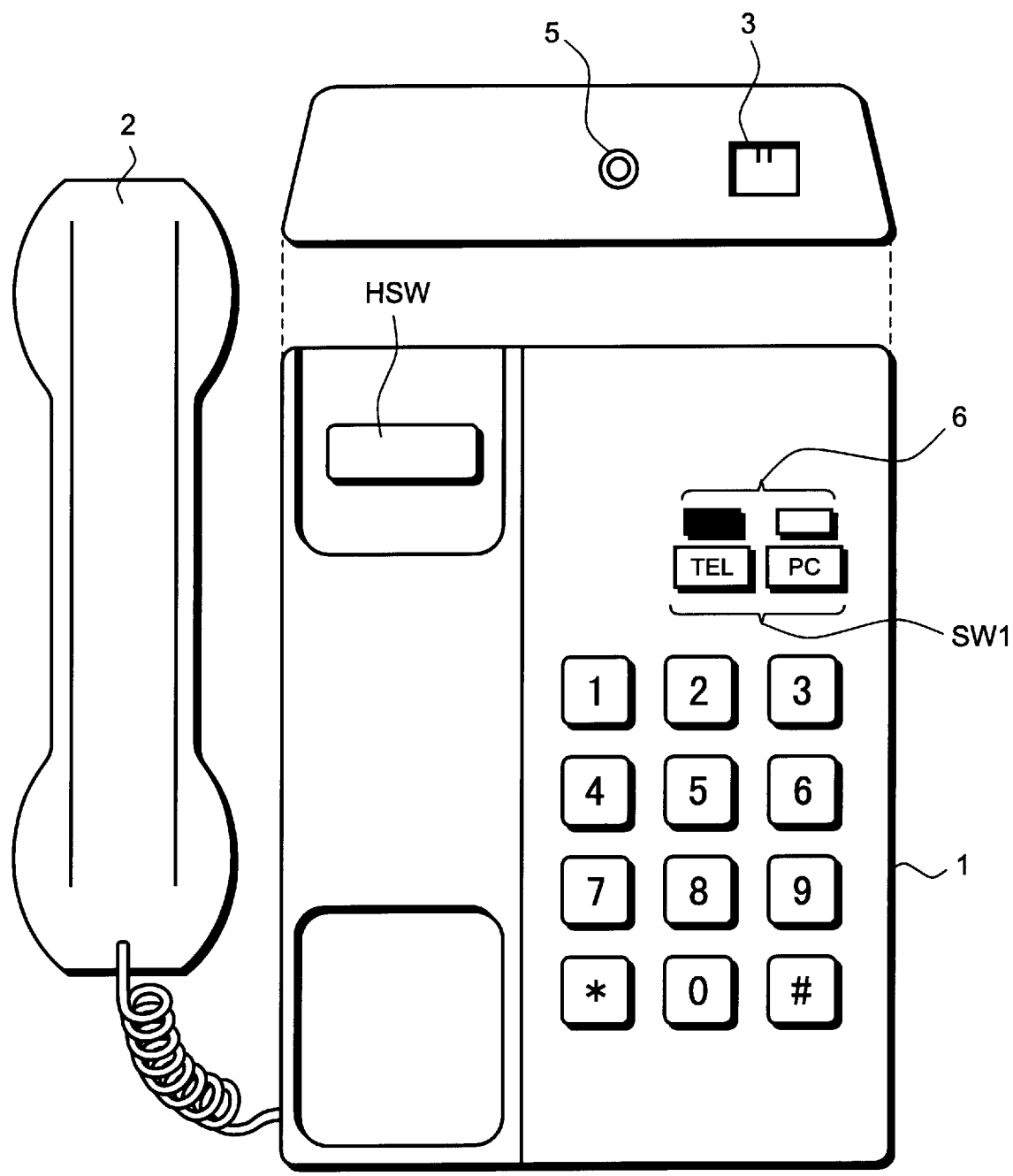
FIG. 3 is an outer view showing an embodiment of the telephone according to the invention.
Figure 4:
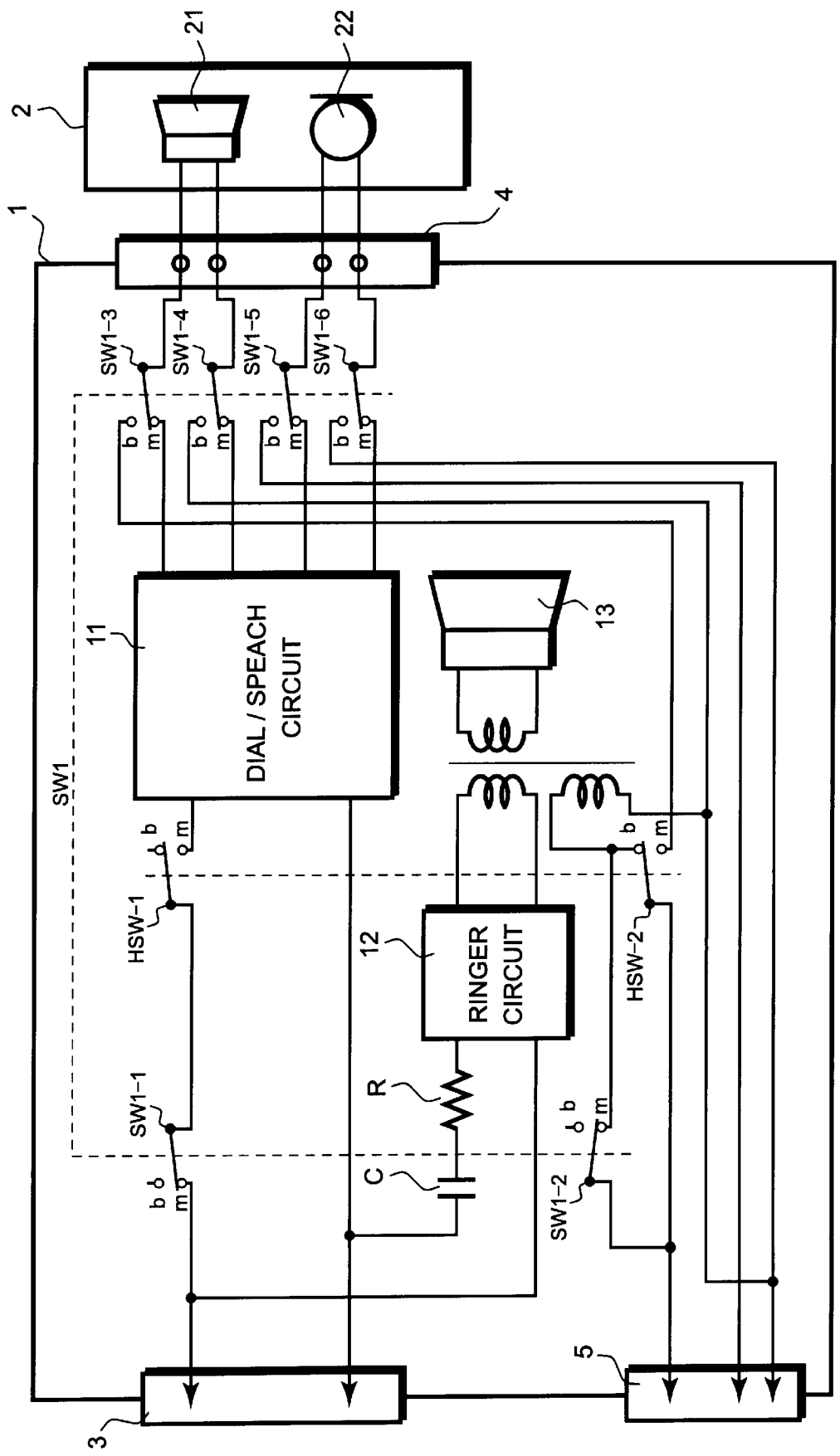
FIG. 4 is a block diagram showing the inner circuit construction of the embodiment of the invention.

FIG. 3 shows, in an outer view, the embodiment of the invention, and FIG. 4 shows, in a block diagram, the inner circuit construction of the same. In FIGS. 3 and 4, parts like those in FIGS. 1 and 2 are designated by like reference numerals and symbols. Only the difference in the embodiment from the prior art telephone shown in FIGS. 1 and 2 will be explained with reference to FIGS. 3 and 4.

Referring to the outer view shown in FIG. 3, on the front of an upper portion of a telephone 1 is provided, in addition to a connector 3 for connection to a phone line, a microphone/loudspeaker connector (or pin jack) 5. The connector 5 is connected to a voice input/output interface of a computer network (not shown). The connector 5 may be a modular jack as well, instead of the pin jack.

A switch SW1 is also provided on the front of the body 1. The switch SW1 has buttons labeled "TEL" and "PC", and it is a seesaw switch in which either button is raised by depressing the other button. Pilot lamps 6 (i.e., light-emitting diodes or LEDs) are provided for the buttons "TEL" and "PC" to display the depressed state of either of the buttons.

Where a switch having buttons "TEL" and "PC" with a display function is used, the LED display may be omitted.

Referring to FIG. 4, four switch elements SW1-3 to SW1-6 which together constitute the switch SW1, are inserted between a hand-set connector 4 and a dial/speach circuit 11 which is a telephone circuit. The switch elements SW1-3 to SW1-6 can make a selection as to whether the hand-set 2 is to be connected to the telephone circuit 11 or to the microphone/loudspeaker connector 5.

The switch SW1 has a further switch element SW1-1, which serves to turn on and off the connection between the connector 3 and the telephone circuit 11.

The switch SW1 has a still further switch element SW1-2. This switch element SW1-2 and a hook switch HSW-2 which is interlocked to a hook switch HSW-1, serve to make a selection as to whether a ringer loudspeaker 13 is to be driven by a ringer circuit 12 or by a signal from the connector 5.

FIG. 5 shows the relationship of the states of the switches (including the hook switch). The states shown in the rightmost column in FIG. 5 are as follows.

State 1: The switch SW1 is set to the "TEL" side, and the hand-set 2 is set on the cradle (i.e., in the on-hook state). The telephone-set is thus in its waiting state, and the ringer loudspeaker 13 is ready to provide a call tone of the telephone (i.e., ringer tone) and also a call tone from the computer network.

State 2: The switch SW1 is on the "TEL" side, while the hand-set 2 is in the off-hook state. In this state, the telephone circuit is in a call-ready/speaking state. A call tone from the computer network is provided from the ringer loudspeaker 13 through "m" contact of the switch element SW1-2.

State 3: The switch SW1 is on the "PC" side, and the hand-set 2 is in the on-hook state. The telephone is in the waiting state, and the ringer loudspeaker 13 is ready to provide a call tone of the telephone and also a call tone from the computer network. In this state, however, the call tone from the computer network is provided by the ringer loudspeaker 13 through "b" contact of the switch HSW-2.

State 4: Switch SW1 is on the "PC" side, and the hand-set 2 is in the off-hook state. Since the switch element SW1-1 is on "b" contact side, the telephone circuit is in the open state. In this state, a call tone of the telephone is provided from the ringer loudspeaker 13. Since the switch element SW1-2 is on "b" contact side and the switch HSW-2 is on "m" contact side, as a path from a PC loudspeaker terminal is not connected to the ringer loudspeaker 13.

As has been described in the foregoing, according to the invention, there is provided a switch which can make a selection as to whether the hand-set exclusive for the telephone is to be connected to the telephone circuit or to a voice input/output interface of a personal computer network. It is thus possible to use the hand-set as a voice input/output device for a computer such as a PC.

While the invention has been described in its preferred embodiment, it is to be understood that the words which have been used are words of description rather than limitation and that changes within the purview of the appended claims may be made without departing from the true scope of the invention as defined by the claims.

What is claimed is:

1. A telephone, comprising:

a telephone handset including a microphone and a loudspeaker;

a telephone circuit for conventional two-way telecommunication over a public telephone network;

a first connector that establishes a first two-way communication path between the telephone circuit and the public telephone network;

a second connector that establishes a second two-way communication path comprised of:

a signal path between the handset microphone and an audio input circuit of a computer which is separate from the telephone; and a signal path between the handset loudspeaker and an audio output circuit of the computer; and a selector operable by a user for alternatively enabling the first or the second communication path, whereby the telephone handset alternatively operates as an audio interface for conventional telecommunication or for audio telecommunication though the computer network connection established by the computer.

2. The telephone according to claim 1, further including a ringer loudspeaker, and in which the selector includes a switch that connects the ringer loudspeaker to the computer through the second communication path when the first communication path is enabled for conventional telecommunication.

3. The telephone according to claim 2, in which the selector includes a switch that disconnects the telephone circuit from the telephone line when the second communication path is enabled.

4. The telephone according to claim 1, in which the selector includes a display that identifies the enabled communication path.

5. The telephone according to claim 1, in which the computer is a personal computer.

6. The telephone according to claim 1, in which the selector includes a switch that disconnects the telephone circuit from the telephone line when the second communication path is enabled.

7. The telephone according to claim 1, further including:

a ringer circuit and a ringer loudspeaker connected to the ringer circuit; and in which the selector includes a switch that connects the ringer loudspeaker to the computer through the second communication path when the first communication path is enabled for conventional telecommunication.

* * * * *